United States Patent
Freiwald et al.

(10) Patent No.: US 9,672,182 B2
(45) Date of Patent: Jun. 6, 2017

(54) HIGH-SPEED SERIAL RING (71) Applicant: Infineon Technologies AG, Neubiberg (DE)

(72) Inventors: Axel Freiwald, Munich (DE); Klaus Scheibert, Grasbrunn (DE)

(73) Assignee: Infineon Technologies AG, Neubiberg (DE)

( * ) Notice: Subject to any disclaimer, the term of this patent is extended or adjusted under 35 U.S.C. 154(b) by 329 days.

(21) Appl. No.: 14/464,991

(22) Filed: Aug. 21, 2014

(65) Prior Publication Data

US 2016/0055114 A1 Feb. 25, 2016

(51) Int. Cl.
| | |
|---|---|
| *G06F 15/16* | (2006.01) |
| *G06F 13/40* | (2006.01) |
| *G06F 1/10* | (2006.01) |
| *G06F 13/42* | (2006.01) |
| *H04L 12/42* | (2006.01) |

(52) U.S. Cl.
CPC ............ *G06F 13/4068* (2013.01); *G06F 1/10* (2013.01); *G06F 13/4221* (2013.01); *H04L 12/42* (2013.01); *Y02B 60/1228* (2013.01); *Y02B 60/1235* (2013.01)

(58) Field of Classification Search
CPC ....... H04L 12/42; G06F 1/10; G06F 13/4068; G06F 13/4221
USPC .......................................................... 709/251
See application file for complete search history.

(56) References Cited

U.S. PATENT DOCUMENTS

| | | | | | |
|---|---|---|---|---|---|
| 3,564,147 | A | * | 2/1971 | Puente | H04B 7/18528 370/321 |
| 3,665,405 | A | * | 5/1972 | Sanders | H04J 3/1647 370/503 |
| 4,028,667 | A | * | 6/1977 | Breslau | H04L 12/4637 709/225 |
| 4,236,245 | A | * | 11/1980 | Freeny | H04L 12/43 370/389 |
| 4,561,088 | A | * | 12/1985 | Champlin | H04L 12/437 370/222 |
| 5,056,012 | A | * | 10/1991 | Spiotta | G06F 15/17 709/251 |
| 5,235,593 | A | * | 8/1993 | Grow | H04L 12/433 370/452 |
| 5,289,390 | A | * | 2/1994 | Unverrich | H04L 12/2602 345/1.1 |
| 5,341,374 | A | * | 8/1994 | Lewen | H04L 12/6418 370/450 |

(Continued)

*Primary Examiner* — Paul R Myers
(74) *Attorney, Agent, or Firm* — Eschweiler & Potashnik, LLC (57) ABSTRACT

Methods and systems for transferring a high-speed data signal between more than two electronic devices within a system comprising a master device and a plurality of slave devices are presented. The master device and the plurality of slave devices are connected through high-speed links between high-speed interfaces, thereby forming a closed ring. The high-speed interfaces are comprised by the master device and each of the plurality of slave devices, respectively. A common low frequency clock signal is provided by the master device to each of the slave devices, and a high-speed interface communication method for communication between the master device and the plurality of slave devices through the high-speed links is used.

20 Claims, 4 Drawing Sheets

(56) References Cited

U.S. PATENT DOCUMENTS

| | | | | |
|---|---|---|---|---|
| 5,638,512 | A * | 6/1997 | Osman | H04L 12/433 709/251 |
| 5,781,545 | A * | 7/1998 | Matthew | H04L 12/42 370/389 |
| 5,786,913 | A * | 7/1998 | Pfeiffer | H04J 14/08 370/460 |
| 5,802,321 | A * | 9/1998 | Buda | G05B 19/0423 370/452 |
| 6,041,062 | A * | 3/2000 | Yamato | H04J 3/0623 370/242 |
| 6,292,200 | B1 * | 9/2001 | Bowen | G06T 15/005 345/506 |
| 6,327,400 | B1 * | 12/2001 | Harstead | H04B 10/27 385/16 |
| 6,658,495 | B1 * | 12/2003 | Yoshitake | H04L 12/433 709/250 |
| 6,874,048 | B2 * | 3/2005 | Knapp | G06F 13/4286 370/345 |
| 7,212,490 | B1 * | 5/2007 | Kao | H04L 12/42 370/222 |
| 7,280,550 | B1 * | 10/2007 | Rosenboom | H04J 3/0682 370/404 |
| 2002/0042844 | A1 * | 4/2002 | Chiazzese | G06F 1/14 709/248 |
| 2005/0030902 | A1 * | 2/2005 | Choi | H04L 12/6418 370/252 |
| 2006/0253836 | A1 * | 11/2006 | Hiroshi | G06F 17/5045 717/114 |
| 2008/0232380 | A1 * | 9/2008 | Nakayama | H04J 3/0691 370/400 |
| 2010/0118721 | A1 * | 5/2010 | Sakurada | H04J 3/0664 370/252 |
| 2013/0242749 | A1 * | 9/2013 | Herz | G06F 11/0745 370/241 |
| 2014/0115190 | A1 * | 4/2014 | Przybylski | G06F 13/4243 709/251 |
| 2015/0016278 | A1 * | 1/2015 | Hayes | H04L 43/0864 370/249 |

* cited by examiner

HIGH-SPEED SERIAL RING

FIELD

The disclosure relates to a method and system for high-speed data transfer between electronic devices. More particularly, it relates to a method and system for high-speed serial communication between more than two electronic devices on a printed circuit board.

BACKGROUND

However, today there are no solutions available which allow for more than two components or devices to communicate with the same interface at high bit rates. So far, only high-speed point-to-point communication is supported by high-speed standards such as Ethernet or HSSL. For these or other reasons there is a need for a method and system for high-speed serial communication between more than two electronic devices.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and together with the description serve to explain the principles of the disclosure. Other embodiments of the present disclosure and many of the intended advantages of the present disclosure will be readily appreciated, as they become better understood by reference to the following detailed description.

DETAILED DESCRIPTION

To this date, high-speed serial interfaces have emerged to become a part of design in integrated circuits (ICs) for high-speed high-bandwidth computing and communication systems such as chipsets and processors. Nearly all electronic apparatuses comprise several of such ICs or other electronic components which may be connected on and supported by a printed circuit board (PCB). The electronic components may need to communicate with one another. For this, the PCB provides, e.g., conductive tracks or pads etched from copper sheets laminated onto a non-conductive substrate. For one component it might not be sufficient to communicate with only one other, but it might need to transmit data to or receive data from several other components. In general, the links connecting the high-speed serial interfaces need to be able to support high-speed data transmission. In comparison with early parallel data bus technologies such as PCI, PCIX, or parallel ATA, a serial link is less susceptible to crosstalk, ground bounce, and clock skew because of, e.g., differential signaling and/or embedded clocking schemes. Therefore, much higher data rates over a considerably longer transmission distance can be achieved.

High-speed data transmission is particularly important for safety related control systems, e.g., for vehicles such as cars, motorcycles, trucks, e.g., advanced driver assistance systems, chassis domain controllers or autopilots for cars in automotive industry. In such systems it is of uttermost importance that data is transferred at high-bit rates from one electronic component to another.

Today, high-speed data transmission between electronic components is achieved by using different serial interface standards. The Open Systems Interconnection model (OSI) defines seven different layers. Each layer comprises interfaces with corresponding network protocols which allow for communication within that layer. The most widely used high-speed interface standards are Ethernet and serial ATA (SATA). The Ethernet is standardized in IEEE 802.3 and it provides services for the physical layer and the data link layer of the Open Systems Interconnection (OSI) model. The Ethernet physical layer comprises coaxial, twisted pair and fiber optic physical media interfaces, and it supports speed ranges from 1 Mbit/s to 100 Gbit/s. SATA is a computer bus interface used for data exchange between a processor and a mass storage device, such as a hard drive. The standard SATA connector comprises 15 pins. SATA supports speeds ranging from 1.5 Gbit/s to 6.0 Gbit/s.

Both Ethernet and SATA were developed for communications between printed circuit boards (PCB). Both, Ethernet and SATA use differential signaling to achieve high-speed data transmission. In differential signaling signals are transmitted by using two wires with the same impedance. The current is flowing in opposite directions within the two wires. Therefore, when measuring the difference between the potentials of the two wires electromagnetic interference effects on the signal cancel out.

Ethernet is commonly used for high-speed communication between two electronic components (point-to-point). It is, however, often necessary for more than one component to communicate with the same interface. This might occur for an electronic master device to communicate with several electronic slave devices, all of which are connected on a printed circuit board (PCB). For such cases all components might be connected to an Ethernet switch in a star configuration by using Ethernet standards. This star-like configuration suffers, however, from several disadvantages: since Ethernet standards extend over the OSI physical layer and data link layer the software implementation of the corresponding protocols, the so-called communication stack, causes high handling efforts. The electronic components may be linked to the Ethernet switch through a Media Independent Interface, MII, or a Reduced MII, RMII; these two interfaces use a high number of pins (17 pins for MII, 10 pins for RMII). Therefore, they cause a high implementation effort, and consume a vast space on the PCB. Furthermore, Ethernet standards use an embedded clocking scheme. Because of this, Ethernet standards may be used for so-called asynchronous circuits. This means, that a clock signal can be recovered from the encoded data. This implies, however, that the clock signal has to be recovered before reading data and distributing them to the addressed device. From this, in addition to high implementation efforts high latencies may result.

Another possibility for communication of more than one slave devices with one master device is the so-called token ring. The token ring provides services at the OSI data link layer, and it is standardized in IEEE 802.5. Components on a token ring are connected in a ring structure. Data is transmitted by an originator sequentially form one ring component to the next with a control token. The component identifying itself to be the addressee of the data copies them and sets the token to 0. This indicates, in turn, to the originator that the addressee has received and copied the data. Token ring reaches bit rates up to 100 Mbit/s.

From what has been said in the previous two paragraphs it becomes clear that an extension of the Ethernet star-like topology to an Ethernet ring topology would reduce the raw transmission rates drastically with an increasing number of components included in the ring. This is because of the embedded clocking scheme used in the Ethernet standards: each component has to recover the clock signal from the sent data before being able to forward or not the received data.

A further solution for more than one slave components to communicate with the same master device is given by a network where the slave devices are connected through buses with the master device. Such a network shows, however, high and variable impedances depending on the number of slave devices and the position of the slaves in the network. In order to reduce these effects, a reduction of the data transmission speed is necessary. For networks including only four components bit rates may reduce below 100 Mbit/s. Further disadvantages of this solution are the large space occupied on the PCB by the buses, the increasing complexity of the system because of the buses connecting the master device to all slave devices, and the high system cost.

Thus, for reducing the implementation efforts, the production efforts, the costs, the power consumptions, the number of signals, the number of pins, or for other reasons there is a need for a method and system for high-speed serial communication between more than two electronic devices, as described in more detail in the following.

Figure 1:
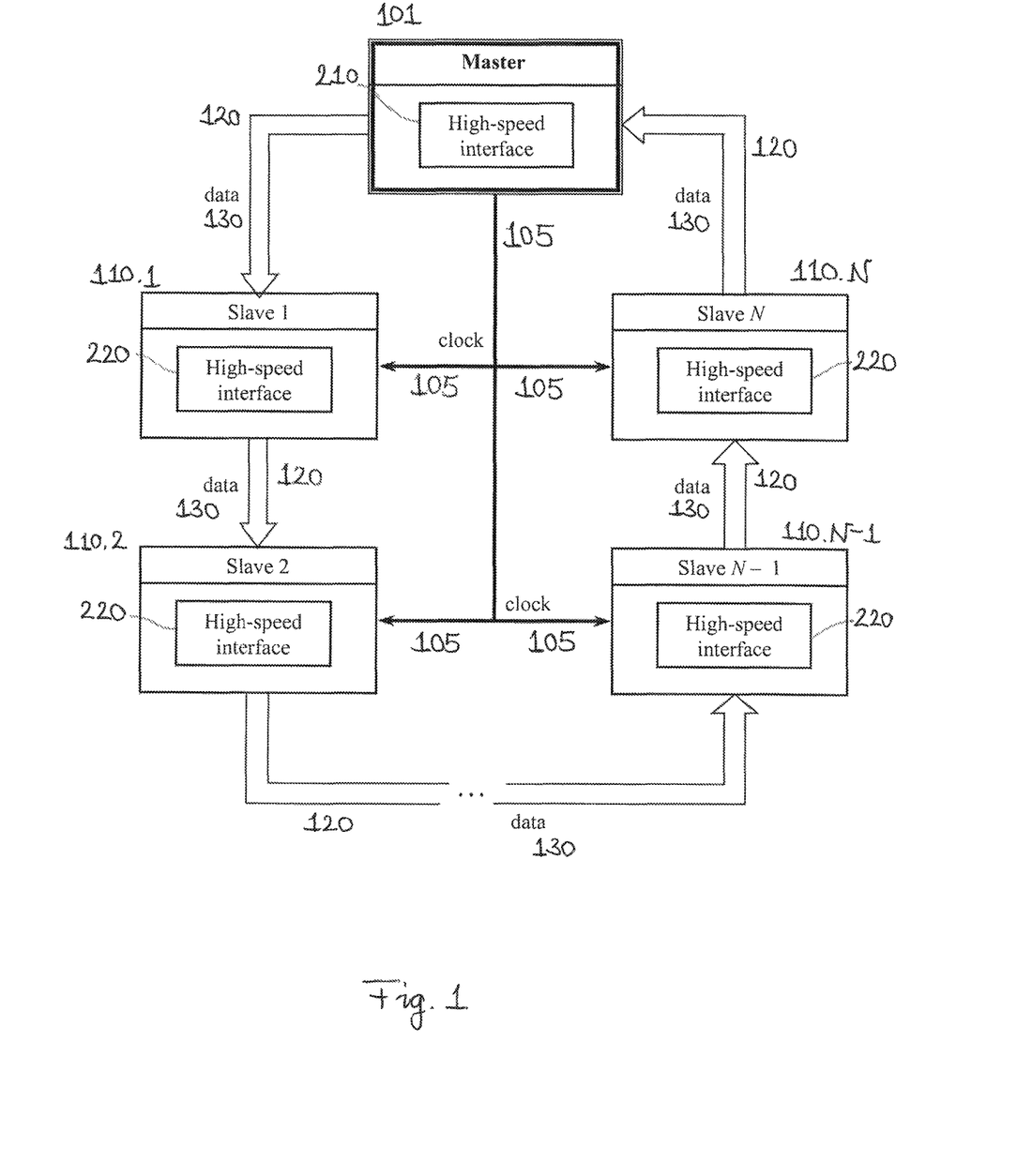
FIG. 1 schematically depicts a high-level diagram of the ring topology comprising one master device and a plurality of slave device according to the disclosure.

FIG. 1 shows a ring topology comprising a master device 101 and a plurality of N slave devices 110.1, 110.2, ..., 110.N−1, 110.N. The master device 101 and the slave devices 110 are serially connected through high-speed links 120 such as to form a closed ring, a high-speed serial ring (HSSR). The high-speed links 120 may be connected to high-speed interfaces 210, 220. Data 130 are transferred through the high-speed links 120. Further, it is shown in FIG. 1 that the master device 101 provides a clock signal 105 to the slave devices 110. According to one embodiment of the disclosure, each of the devices (master device 101 and slave devices 110) comprises a route-through mechanism. This route-through mechanism may automatically route through all incoming data to the outputs. This mechanism will be further described below in relation to FIG. 2. As can be seen from FIG. 1, each device may have a fixed position in the ring structure. The position might preferably be used by the master device 101 as an identifier for addressing one particular slave device 110. For instance, when sending a read command from the master device 101 to a particular slave device 110, only the slave device 110 with the indicated identifier might answer. All other slave devices 110 comprising a different identifier might route through the data stream without change. Since all devices 101, 110 in the ring structure are provided with the same clock signal 105, forming, thus, a synchronous system, the routing through may be performed with a much lower latency as compared to asynchronous systems. This has the advantage that for data transmission high bit rates may be maintained even if a high number of slave devices 110 is comprised by the ring structure.

The preferable interface specifications for transmitting data at high bit rates according to the present disclosure, i.e., the High-Speed Serial Link (HSSL) specifications, will be described below in relation to FIG. 3. HSSL provides services for the OSI data link layer at speeds up to 6 Gbit/s. HSSL may use differential signaling to achieve high-speed data transmission. Further, it might be necessary to extend the HSSL frame specification by introducing an identifier for the devices comprised by the ring structure. As will become apparent below, this is, however, easily implemented. Therefore the present embodiment of the disclosure provides a low cost solution which allows more than two components to communicate at high bit rates with the same interface. Moreover, the presented solution is easy to implement. When using an implementation comprising the HSSL specifications, as shown below in relation to FIG. 2, only five signals on the PCB might be needed. Therefore, only little space is consumed on the PCB. Since the devices 101, 110 comprised by the ring structure are serially connected, the communication between each of two neighbored devices, e.g., 101 and 110.1, 110.$k$−1 and 110.$k$, 110.N−1 and 110.N, may be handled with direct point-to-point connections. Therefore, this communication might always run at full speed according to the high-speed communication, e.g., HSSL, specifications. Because of this, the communication within the entire ring structure is maintained at high speed.

The master device 101 may be, e.g., a microcontroller, an integrated circuit, or an application-specific integrated circuit (ASIC). Any of the slave devices 110 may be, e.g., a microcontroller, an integrated circuit, an ASIC or a device with only basic execution capabilities. Although only four slave devices 110 are explicitly shown in FIG. 1 (i.e., N=4), this is understood to be merely exemplary, any other plurality of slave devices 110 is possible. The master device 101 and each of the slave devices 110 may comprise at least one high-speed interface 210, 220, respectively. Preferably, each interface is capable of running in a master or in a slave mode. This has the advantage, that only one interface needs to be designed. There is no need to distinguish between master devices 101 or slave devices 110 at the construction stage. It is only during the configuration phase of the system when the role of the interface (master interface 210 or slave interface 220) has to be defined. It might be advisable not to change the roles within the system during an application. It is, however, also possible to hand over the master function from one device to another during an application through higher protocol layers or other interfaces via the same PCB.

An exemplary high-speed interface 210, 220 will be described in more detail below in relation to FIG. 2. The high-speed interface 210, 220 allows for high-speed communication between either the master device 101 and a slave device 110, or between two slave devices 110. High-speed communication supports bit rates of at least 1 Mbit/s, preferably bit rates between 20 Mbit/s and 20 Gbit/s, most preferably bit rates between 320 Mbit/s and 3 Gbit/s. The high-speed interfaces 210, 220 may be connected through high-speed links 120. These links might comprise the physical lines which connect two devices.

For high-speed data transmission it might be preferable to use as a physical layer specification differential signaling, most preferably Low Voltage Differential Signaling (LVDS). LVDS will be described in more detail below in relation to FIG. 2. Concerning the data link layer, High-Speed Serial Interface (HSSI) specifications might be used. HSSL may be used for local communication mainly on the same printed circuit board (PCB). It might be used for communication at short distances on a PCB. The range of applicability of HSSL may be dependent on the transmission speed. The frame structure of HSSL will be described further below in relation to FIG. 3.

According to the embodiment shown in FIG. 1, the master device 101 may provide a clock signal 105 to the slave devices 110. The clock signal 105 may be produced by a clock generator. The clock generator might preferably comprise a crystal oscillator. The clock signal 105 provided by the master device 101 may serve as in input to the single slave devices' 110 clock synthesizers. Preferably, a phase-locked-loop (PLL) based clock distribution method might be used in the master device 101 or in each slave device 110. Each device comprising a PLL might be able to fan out multiple clock signals of different frequencies. These frequencies might be lower or greater compared to the input clock signal 105. The concepts of PLL based clock distribution methods are well known to the person skilled in the art and will, thus, not be detailed out further in this specification. It might be advantageous to use a low frequency clock signal 105. The frequencies of the clock signal 105 may be dependent on materials and voltage levels. Frequencies of these clock signals range between 5 MHz and 80 MHz, preferably between 10 MHz and 30 MHz, most preferably a low frequency clock signal of 20 MHz is used. Given a bit rate for data transmission between two devices 101, 110, it might be advisable to choose a clock frequency such that the ratio of the given bit rate and the clock frequency ranges between 5 bits and 30 bits, preferably between 10 bits and 20 bits. For instance, if a bit rate of 320 Mbit/s is desired, a clock frequency ranging between 16 MHz and 32 MHz might be preferable. An advantage of PLL based clock distribution systems is that all the output clock signals may have a fixed phase relation to each other. Because of this, even when transmitting a high-speed data signal from one device to the other, the operation of the devices may still be synchronized with little efforts. Moreover, since all devices 101, 110 within the ring structure are operating on the same clock base 105, clock skew and jitter do not accumulate. That is, clock skew and jitter will not increase when the number N of slave devices 110 comprised by the ring structure increases. Furthermore, because of the low frequency of the clock signal 105 electromagnetic interference effects, reflections and losses through radiation may get handled with little efforts.

So far, it has been assumed that the master device 101 provides the low frequency clock signal 101 to all slave devices 110. In another embodiment of the disclosure the low frequency clock signal 105 may route through the high-speed interfaces 210, 220. That is, the low frequency clock signal 105 might be looped in the ring. This has the advantage that changes in the fan out of the low frequency clock signal 105 provided by the master device 101 would not influence the internal clock signals of the slave devices 110. In this case, the data transfer within the HSSR is given by point-to-point communications between each of the neighbored devices of the HSSR comprising the low frequency clock signal 105 of the master device at transmission of the data frame 130.

Figure 2:
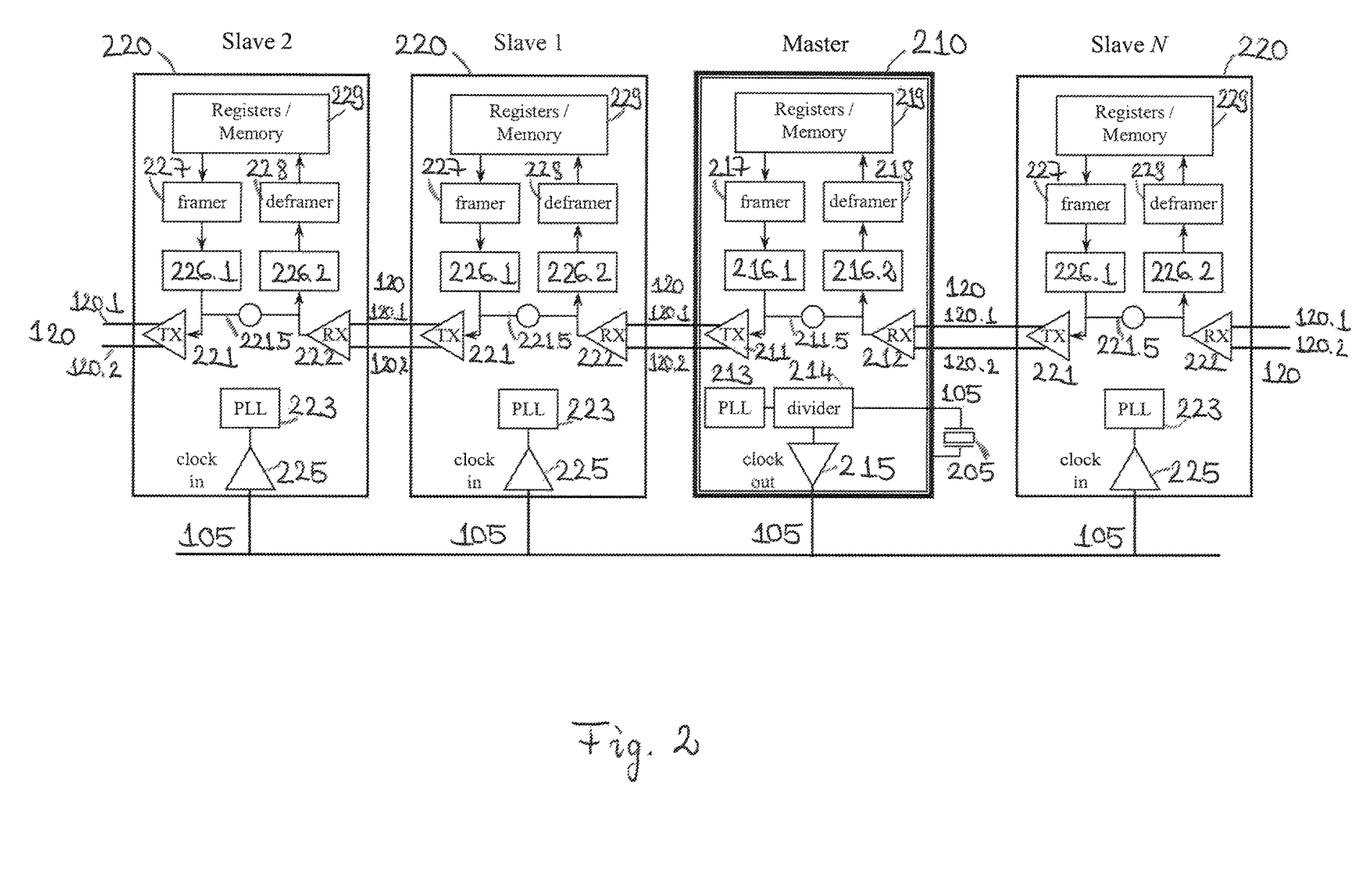
FIG. 2 schematically depicts a connection between four exemplary high-speed interface comprised by the devices of the disclosure.

FIG. 2 shows a plurality of interfaces 210, 220 that may be comprised by neighbored devices of the HSSR. In FIG. 2 an interface 210 comprised by the master device 101 and three interfaces 220 each comprised by a slave device 110.1, 110.2, 110.N, respectively, of the HSSR are exemplarily shown. The interfaces may be connected by a link 120 supporting high-speed data transfer. This high-speed link 120 might support a high-speed interface communication method, at the physical layer, preferably a serial link standard. It may further be advantageous that this high-speed interface communication method comprises differential signaling, preferably low voltage differential signaling (LVDS). In the ring structure, the outputs TX 211, 221, e.g., LVDS outputs, of one device are connected to the inputs RX 212, 222, e.g., LVDS inputs, of the next device until the loop is closed. Because of this connection, data may circulate in one direction (counter-clockwise as shown in FIG. 1, from right to left as shown in FIG. 2). The interfaces 210 comprised by the master device 101, on one hand, and the interfaces 220 by the slave devices 110 might be the same. The outputs TX 211, 221 and the inputs 212, 222 may also be internally connected 211.5, 221.5 within each interface, as shown in FIG. 2. This internal connection has the advantage, that incoming data may be routed through from an input 212, 222 to an output 211, 221. A splitter at the input 212, 222 of each interface 210, 220 may be used for routing through the incoming data toward the output 211, 221, and at the same time shifting the data into the component 216.2, 226.2 and the deframer module 218, 228.

The master device 101 may provide a low frequency clock signal 105, e.g., ranging from 10 MHz to 30 MHz, preferably 20 MHz, to all slave devices 110. The low frequency clock signal 105 might be generated by a clock generator 205, the clock generator 205 preferably comprising a crystal oscillator. At the physical layer, each interface 210, 220 may comprise a PLL 213, 223, respectively, to generate internal clock signals of each device 101, 110, respectively. The interfaces 220 of the slave devices 110 may need to receive the low frequency clock signal 105 from the master device 101 to be enabled to transfer data 130. Each interface 220 of the salve devices 110 may generate internally high frequency clock signals necessary for high-speed data transfer may be generated internally form the low frequency clock signal 105. This may be done, e.g., by using a PLL based clock distribution system 223 taking the low frequency clock signal 105 as a reference clock. The internal high frequency clock signals may range between 20 Mbit/s and 1 Gbit/s, preferably be 320 Mbit/s. The interface 210 of the master device 101 may comprise a divider. The divider is adapted to provide the low frequency clock signal 105, generated by the clock generator 205, to both the master device's 101 internal PLL based clock distribution system 213, and to the fan out 215 of the low frequency clock signal 105. The master device 101 may be adapted to distribute the low frequency clock signal 105 from the fan out 215 to the inputs 225 of the low frequency clock signal 105 comprised by the slave devices' 110 interfaces 210.

Further, the interfaces 210, 220 may also comprise other components 216.1, 216.2, 226.1, 226.2 such as serial-to-parallel converters or phase correlators. Serial-to-parallel converters might allow for converting the received data from the serial format to parallel format for storing it in the registers or memory. The same is true when data in parallel format are read from the registers or memory which need to be converted to serial format for transmission through the high-speed serial links. A correlator may be used for synchronizing incoming frames. At the data link layer a framer module 217, 227 and a deframer module 218, 228 are shown, respectively, for the master interface 210 and the slave interface 220. The framer module 217, 227 combines data and control information according the high-speed communication protocol, e.g. HSSL, specifications. This will be explained further below in relation to FIG. 3. The deframer module 218, 228 may decode the received frame and separates the data from the control information. Finally each interface 210, 220 may comprise registers and/or memory 219, 229, respectively, for storing data.

The role of the interface 210, 220 (master or slave, respectively) may be defined during the configuration or initialization phase. It might be preferable that each device 101, 110 within the ring structure maintains its role during an application. The role of each device might be defined by storing a corresponding identifier in the registers 219, 229 of each device 101, 110. The identifier of one particular device 101, 110 might comprise the position of this particular device 101, 110 in the ring. This position might be used by the master device 101 for addressing a particular slave device 110. In an alternative embodiment of the disclosure, the master device 101 might assign the identifiers to the slave devices 110. The master device 101 may be adapted to assign identifiers to the slave devices 110 when starting an application. In one embodiment of the disclosure each device 101, 110 comprised by the ring structure might be able to identify any of the other devices. This has the advantage, that not only the master device 101 might send requests to slave devices 110, but also one selected slave device 110 might be able to send request to another slave device 110.

The inputs 212, 222 and/or outputs 211, 221 of each interface 210, 220, respectively, preferably comprise low voltage differential signaling (LVDS) inputs and/or differential LVDS outputs. LVDS is standardized according to the IEEE 1596.3 specification or according to the ANSI/TIA/AIA-644-1995 specification. LVDS is a high-speed, low power serial interface communication method and standard for high-speed data transfer. LVDS is adapted for low power consumption and lower supply voltages at short ranges. The supply voltages preferably range between 0.8 V and 2.0 V, the most preferable supply voltage is 1.2 V. Differential signaling implies that two wires 120.1, 120.2, preferably twisted wires, are used in which the current is flowing in opposite directions. In one embodiment, at the transmitter side 211, 221 a constant current ranging between 2.0 mA and 5 mA, most preferably 3.0 mA, may be injected into the wires 120.1, 120.2. The direction of the current might determine the logic level of the signal. At the receiver 212, 222, the current may flow through a resistor ranging between 80 ohms to 150 ohms, preferably between 90 ohms and 120 ohms, most preferably 100 ohms. Then, the current may flow back toward the transmitter 211, 221 in opposite direction. From this a voltage difference of, e.g., 0.3 V may result at the resistor. Information is transmitted, thus, through the difference between the voltages of the two wires 120.1, 120.2. This difference may range between 0.2 V and 0.5 V, preferably 0.3 V. These low supply voltages and in particular the current flowing in opposite directions have the advantage of weaker electromagnetic fields which basically cancel out. Thus, less electromagnetic interference effects occur which might disturb the data transfer. The use of twisted wire pairs might further reduce the afore-mentioned unwanted effects. LVDS is particularly suited for high-speed data transfer at short distances. The range of applicability may depend on the materials, energies and/or wiring. Short distances have the advantage of further reducing the electromagnetic interference effects on the signal.

In the following it is described how an initiator, e.g., the master device 101, may read information from or send information to a selected target device, e.g., a slave device 110, comprised in the high-speed serial ring (HSSR). The high-speed communication between the initiator and a target device might consist of two steps: sending a command by the initiator, and responding to the command by the target device. In order for all devices 101, 110 comprised in the HSSR to be able to communicate with one another they may use a common protocol. At the data link layer data (payload) and control information may be combined into a frame by the framer module 217, 227 comprised by the initiator. At the target device, the payload may be extracted by the deframer module 218, 228 out of a frame. Since the data link layer of the OSI model is now considered, in the following, the transfer of one single frame is discussed. It should, however, be appreciated that a data stream 130 at the data link layer may be represented by a plurality of frames.

Figure 3:
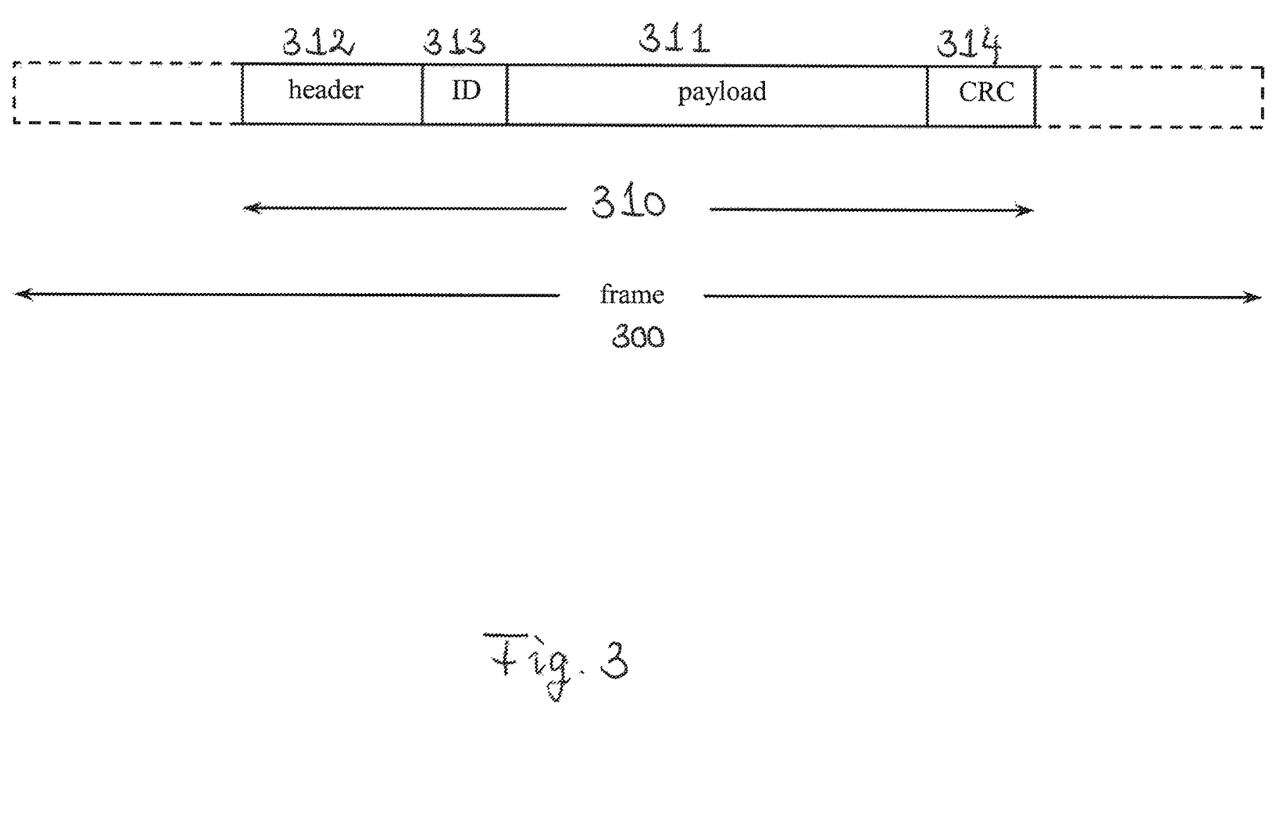
FIG. 3 shows a preferable frame structure of the HSSL specifications according to the disclosure.

An example frame element 310 comprised by the frame 300 used according to an embodiment of the disclosure is shown in FIG. 3. It should be understood that the frame 300 used in an embodiment might be larger than the frame element 310 shown in FIG. 3. For instance, a preamble might be added allowing the receiving devices 101, 110 to synchronize with the incoming signal. The frame structure used according to one embodiment of the disclosure is based on the HSSL specifications. The frame element 310 shown in FIG. 3 comprises payload 311, header 312, ID 313, and cyclic redundancy check (CRC) 314 or error-correcting code (ECC). The commands transmitted by the initiator are comprised by the payload part 311 of the frame element 310. The command frames might include write frames, used by the initiator to request the target controller to write data, or read frames, used by the initiator to request the target device to read and deliver a content from its register or memory. Responses transmitted by the target device are also comprised by the payload part 311 of the frame element 310. Response frames may be sent by the target device to deliver the requested data or to report a successful (so-called acknowledge frame) or unsuccessful (so-called target error frame) completion of a request. The length of a frame 300 may depend on the length of the payload 311. According to the specifications, e.g., HSSL, used in one embodiment, payload length may range between 8 bits and 1024 bits, preferably between 8 bits and 256 bits. The header 312 may contain protocol information that is required additionally to the payload data 311. For instance, the header 312 might contain information about the payload length. The length of the header 312 may range between 4 bits and 32 bits, preferably between 8 bits and 24 bits. The ID 313 may be used to indicate the selected target device which the command sent by initiator is intended for. Likewise, the ID 313 may be used by the target device to indicate the device which is intended to receive the response. This might be the initiator itself, e.g., the master device 101, but it could also be any other device 101, 110 in the HSSR. The length of the ID 313 may range between 3 bits and 16 bits, preferably between 4 bits and 8 bits The CRC 314 may be used to detect accidental changes in the sent data. The CRC 314 or ECC may comprise a check value. This check value might be calculated based on the payload 311 and/or ID 313. Every time the target device receives a frame 300 without detecting an error, it may send a response and/or acknowledge frame to the initiator. If the target detects a frame 300 with a CRC error, it might not send an acknowledge frame; it could, however, send a target error frame. The length of the CRC 314 may range between 4 bits and 64 bits, preferably between 8 bits and 16 bits.

Figure 4:
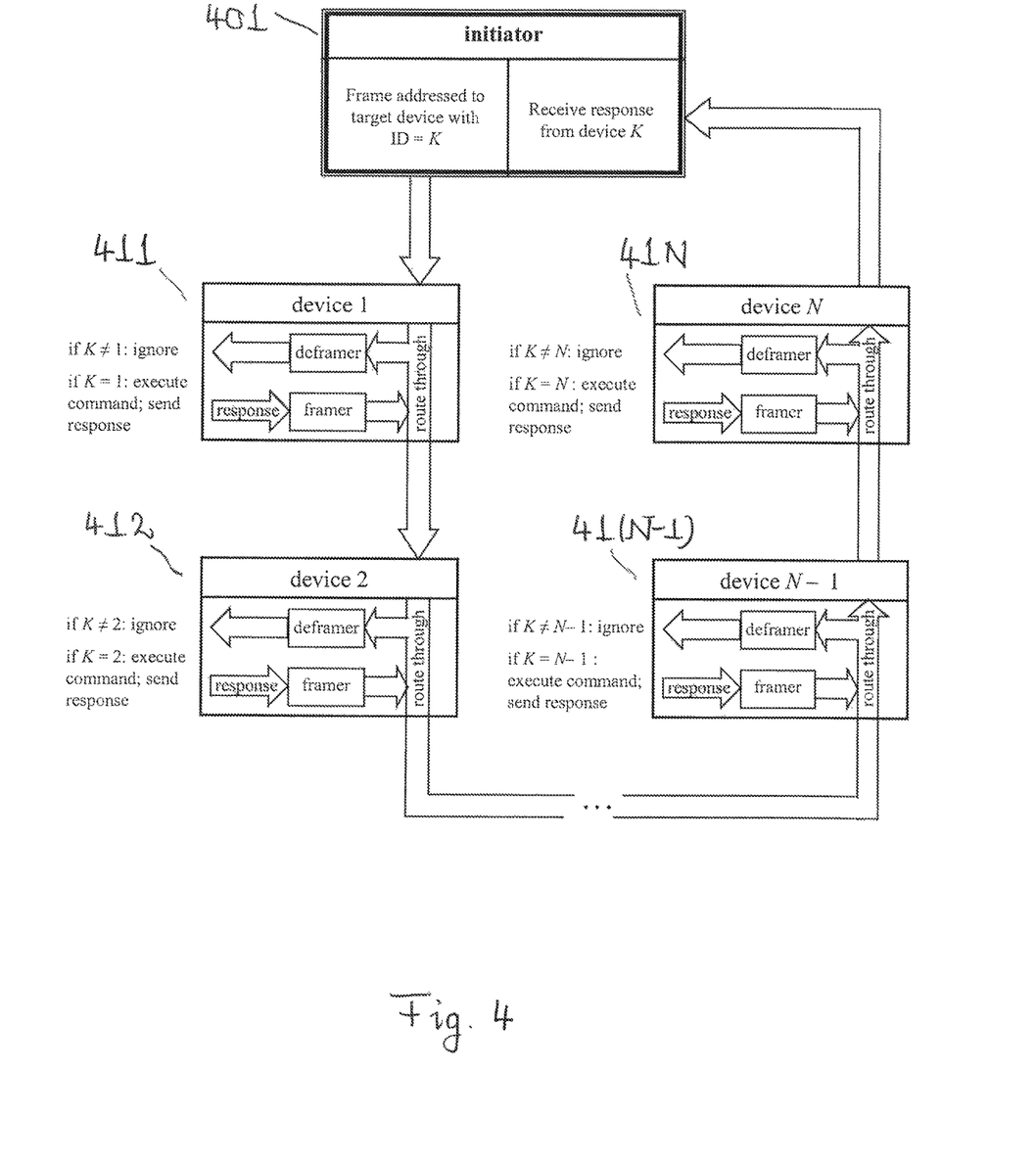
FIG. 4 is a block diagram showing how data sent by an initiator are received at and responded to by a target device within the ring structure of the disclosure.

FIG. 4 shows a block diagram of the process of how data transfer in the HSSR may occur according to one embodiment of the disclosure. The shown initiator may be any of the devices comprised by the HSSR, namely either the master device or any of the slave devices. The same applies to the devices 1, . . . , N shown in FIG. 4. The process starts at block 401: when the initiator wants to send a command to target device, the framer module 217, 227 of the initiator may wrap the command payload 311, header 312, ID 313, CRC 314, and possible other control information into one frame 300. The ID 313 indicates the selected target device which the command is meant for. In the exemplary case of FIG. 4 the selected target device has ID=K. This ID might correspond to the position of a slave device 110.K in the HSSR. The frame may, then, be transmitted to the next neighbor device of the initiator through the output 211, 221 of the high-speed interface 210, 220 of the initiator, block 411. As detailed out above, in one embodiment the LVDS interface communication standard may be used at the physical layer for transmitting the frame through the link connecting the initiator and its next neighbor. The data transfer preferably occurs at the bit rates indicated above, e.g., between 100 Mbit/s and 1 Gbit/s, most preferably 320 Mbit/s. As mentioned previously in relation to FIG. 2, the high frequency clock signals necessary for high-speed data transfer may be generated internally in each device 101, 110 comprised by the HSSR from the low frequency clock signal 105 provided by the master device 101 to all slave devices 110. The frame 300 may be received at the input 212, 222 of the initiator's next neighbor. As can be seen from block 411 and FIG. 2, the received frame 300 is routed through the interface 210, 220 toward the output 211, 221 of the interface 210, 220 of the initiator's next neighbor device. Then, the frame from the input 212, 222 is transmitted from the device to its next neighbor, again, block 412. The route-through 211.5, 221.5 may be performed at each device 101, 110 comprised by the HSSR, blocks 411, 412, . . . , 41(N−1), 41N. Whenever a frame 300 is received, at the same time, at each internal clock cycle, a copy of the frame is, however, also shifted into the deframer module 218, 228. The deframer module 218, 228 extracts the information comprised by the frame 300. In particular, it extracts the information about the identifier in the ID 313 which indicates the selected target device. Further, the ID 313 might be checked with the CRC 314 or the ECC.

Two cases are possible: first, the identifier extracted from the ID 313 may not correspond to the identifier of the device. In this case, the data from the copied frame, stored so far, e.g., in the memory 319, 319, may be deleted. This is shown as the first cases of blocks 411, 412, . . . , 41(N−1), 41N.

In the second case (second alternative of blocks 411, 412, . . . , 41(N−1), 41N) the identifier extracted from the ID 313 may correspond to the identifier of the device. In this case, the deframer module 218, 228 extracts the data from the frame 300. Then, the target device executes the command, e.g., writing data to the memory 219, 229, reading and/or delivering content from a register or memory 219, 229. Upon receipt of the command, the target device might send an "acknowledge" response to the initiator. For this, the framer module 217, 227 wraps an acknowledge frame, as explained above in relation to FIG. 3, header 312, ID 313 of the initiator, CRC 314, and possible other control information into a frame 300. This frame 300 is then routed through the HSSR until arriving at the initiator. The initiator will recognize and extract the acknowledge response in the same way as described in this paragraph. Upon execution of the command received from the initiator, the target device may either deliver the requested data or report a successful or unsuccessful completion of the request. This is done in the same way as described previously for the acknowledge response: the requested data may be wrapped together with header 312, ID 313 of the initiator, CRC 314, and possible other control information into a frame 300 by the framer module 217, 227. This response frame may be transmitted through the HSSR until it arrives at the initiator. The initiator may recognize that the response is intended for it from its own ID extracted from the frame. As pointed out previously, the response frame circulates in the same direction through the HSSR as the command frame received at the target device. Specifically, for the example shown in FIG. 4, the command frame passes from the initiator through device 1, device 2 to at least device K. The response frame of the target device passes through device K+1, . . . , device N to at least the initiator.

In an alternative embodiment of the present disclosure, the ID 313 of the frame element 310 might further comprise a field for the target-device ID, a field for the initiator-device ID, and a field with a response marker. The response marker may comprise a counter the might be set by the target device such as to indicate, e.g., an executed command. Once the respective frame 300 has reached the target device and the target device has executed the sent command or request, as explained before, the target device may send a response to the initiator by copying the ID 313 and setting the response marker.

Because of the route-through mechanism, each device may show a latency of a fixed number of clock cycle. The latencies may be given as multiples of a device's internal high frequency clock signal. This high frequency clock signal might be produced from the low frequency clock signal by the PLL based clock distribution system. The high frequency clock signal may be determined from the bit-rates for high speed data transfer. In order to be consistent with the used protocols and/or standards, all devices comprised by the HSSR might need to use a common high frequency clock signal. For the real-time behavior the sum of all latencies is important. This sum may be defined by the design and the configuration. It is possible to assign each device a latency during the configuration and/or initialization process. The latencies of the devices comprised by the HSSR do not need to be the same. They may, however, need to be specified. Further, for each device the sum of all other devices in the HSSR might be indicated. In an alternative embodiment, the frames might be routed through the HSSR until they end at the device with the indicated latency.

The previous reasoning applies to every device 101, 110 comprised by the HSSR. Once a signal arrives at an input 212, 222 of the high-speed interface 210, 220 of a particular device 101, 110, respectively, the signal may be routed through to the output 211, 221 of the high-speed interface 212, 222, and be further transmitted to the next device. This may be done by using, e.g., the LVDS interface communication standard. This step may be done at every device independently of whether the device is the target device, as indicated by the ID 313, or not. By doing so, the sent data may be looped back to the initiator. This has the advantage that the initiator can check the routed through data for integrity. The initiator may use the sum of latencies of all other devices for identifying the looped-back frame 300. If the data received with a defined latency at the initiator correspond to the sent data, the initiator knows that no data has been lost. Furthermore, by checking for data frames circulating in the ring with latencies corresponding to the sum of latencies of all other devices in the HSSR, the initiator may be able to remove off the HSSR frames that have loop back.

It should be appreciated, again, that in the above discussion, the initiator is not necessarily restricted to be the master device 101. The above discussion applies to all devices 101, 110 comprised by the HSSR. For instance, if a target device receives a command to send a response not to the initiator but to a third device 101, 110, the target device might do so as described previously by executing the command and delivering, e.g., the data to the third device 101, 110. The target device may then indicate the third device in the ID 313 of the response frame instead of the ID corresponding to the initiator.

The previously described embodiments may be used in connection with safety related control systems, e.g., for vehicles such as cars, motorcycles, trucks, e.g., advanced driver assistance systems, chassis domain controllers or autopilots for cars in automotive industry.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The invention claimed is:

1. A method for transferring a high-speed data signal within a system comprising a master device and a plurality of slave devices, the method comprising:
   connecting the master device and the plurality of slave devices through high-speed links between high-speed interfaces, comprised by the master device and each of the plurality of slave devices, respectively, thereby forming a closed ring;
   providing a common clock signal by the master device to each of the slave devices;
   assigning, to each of the master device and the plurality of slave devices in the closed ring, a respective latency;
   indicating, to each of the master device and the plurality of slave devices, a sum of the latencies of all other devices in the closed ring; and
   using a high-speed interface communication method for communication between the master device and the plurality of slave devices through the high-speed links.

2. The method of claim 1, further comprising:
   assigning, to each slave device, at least one respective identifier;
   providing each at least one respective identifier to the master device and to each of the plurality of slave devices.

3. The method of claim 2, further comprising:
   identifying, by the master device, a particular identifier;
   routing through the high-speed data signal from the master device to the slave device assigned to the respective identifier corresponding to the particular identifier.

4. The method of claim 3, further comprising:
   routing through a second high-speed data signal from the slave device assigned to the respective identifier corresponding to the particular identifier to the master device.

5. The method of claim 4, further comprising:
   routing the second high-speed data signal through the entire ring from the slave device assigned to the respective identifier corresponding to the particular identifier back to the slave device assigned to the respective identifier corresponding to the particular identifier.

6. The method of claim 2, further comprising:
   identifying, by the master device, a first particular identifier;
   identifying, by the master device, a second particular identifier;
   routing through the high-speed data signal from the slave device assigned to the respective identifier corresponding to the first particular identifier to the slave device assigned to the respective identifier corresponding to the second particular identifier.

7. The method of claim 1, further comprising:
   specifying for the master device and for each slave device the respective latency comprising a predetermined number of cycles of a common high frequency clock signal,
   wherein the common high frequency clock signal is a multiple of the common clock signal;
   routing through the high-speed data signal at the master device and/or at the plurality of slave devices with delays corresponding to the respective latencies.

8. A system for high-speed data transfer comprising a master device and a plurality of slave devices, wherein
   the master device and each of the slave devices comprises at least one high-speed interface, respectively; and
   the master device and the plurality of slave devices are connected through high-speed links between the high-speed interfaces, thereby forming a closed ring;
   wherein the master device is adapted to provide a common clock signal to each of the slave devices;
   wherein each of the master device and the plurality of slave devices is adapted to cause a respective latency in the closed ring, and each of the master device and the plurality of slave devices stores a sum of the latencies of all other devices in the closed ring; and
   the master device and the plurality of slave devices are adapted to use a high-speed interface communication method for communication through the high-speed links.

9. The system of claim 8, wherein the master device and each of the slave devices each comprise at least one respective identifier out of a plurality of identifiers.

10. The system of claim 9, wherein the master device and the plurality of slave devices are further adapted to:
    route through a high-speed data signal from the master device to the slave device comprising a respective identifier corresponding to a particular identifier,
    wherein the particular identifier is identified by the master device out of the plurality of identifiers.

11. The system of claim 10, wherein the master device and the plurality of slave devices are further adapted to:
    route through a second high-speed data signal from the slave device comprising the respective identifier corresponding to the particular identifier to the master device.

12. The system of claim 11, wherein the master device and the plurality of slave devices are further adapted to:
    route the second high-speed data signal through the entire ring from the slave device comprising the respective identifier corresponding to the particular identifier back to the slave device comprising the respective identifier corresponding to the particular identifier.

13. The system of claim 9, wherein the master device and the plurality of slave devices are further adapted to:
    route through a high-speed data signal from the slave device comprising a respective identifier corresponding to a first particular identifier to the slave device comprising a respective identifier corresponding to a second particular identifier, wherein the first particular identifier and the second particular identifier are identified by the master device out of the plurality of identifiers.

14. The system of claim 8, wherein:

the master device and each slave device are specified by the respective latency each comprising a predetermined number of cycles of a common high frequency clock signal, wherein the common high frequency clock signal is a multiple of the common clock signal; and wherein the master device and the plurality of slave devices are further adapted to route through a high-speed data signal at the master device and/or at the plurality of slave devices with delays corresponding to the respective latencies.

15. The system of claim 8, wherein the master device and each of the slave devices further comprise framer modules, wherein each framer module is adapted to frame an incoming and/or outgoing data signal in accordance with high-speed interface specifications.

16. The system of claim 15, wherein the high-speed interface specifications comprise an HSSL communications protocol.

17. The system of claim 8, wherein a frequency of the common clock signal ranges between 10 MHz and 60 MHz.

18. The system of claim 8, wherein the high-speed interface communication method is a serial link standard.

19. The system of claim 8, wherein the high-speed interface communication method comprises Low Voltage Differential Signaling (LVDS).

20. The system of claim 8, wherein the high-speed data transfer comprises bit-rates of at least 1 Mbit/s, 5 Mbit/s, 20 Mbit/s and/or 320 Mbit/s.

* * * * *